Jan. 23, 1923.
D. PERRIER.
1,443,273
SYSTEM OF ENGAGEMENT AND DISENGAGEMENT FOR BELT TRANSMISSIONS.
FILED OCT. 26, 1920.
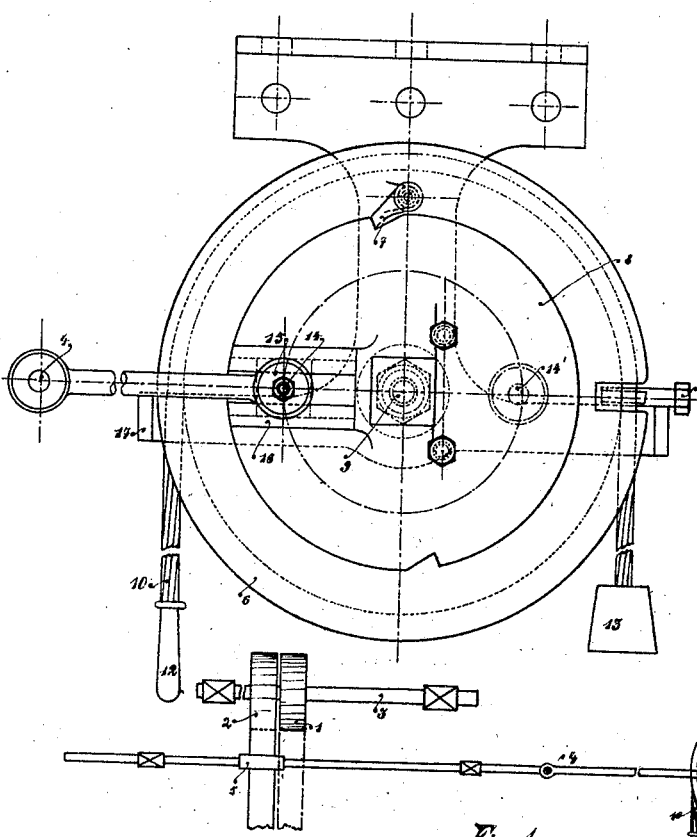
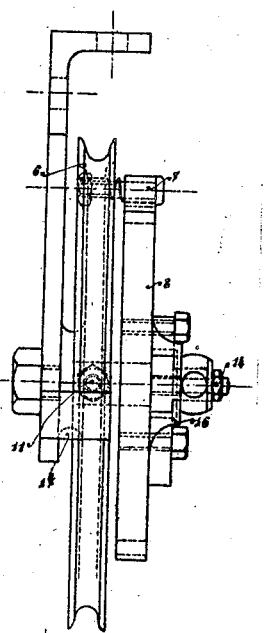

Patented Jan. 23, 1923.

1,443,273

UNITED STATES PATENT OFFICE.

DÉSIRÉ PERRIER, OF NESSONVAUX-LEZ-LIEGE, BELGIUM.

SYSTEM OF ENGAGEMENT AND DISENGAGEMENT FOR BELT TRANSMISSIONS.

Application filed October 26, 1920. Serial No. 419,669.

*To all whom it may concern:*

Be it known that I, DÉSIRÉ PERRIER, a subject of the King of the Belgians, residing at Nessonvaux-lez-Liege, Belgium, have invented certain new and useful Improvements in Systems of Engagement and Disengagement for Belt Transmissions, of which the following is a specification.

The object of the present invention is a system of engagement and disengagement for belt transmissions; it concerns a device which enables a transfer to be effected of the belt from the fixed pulley to the loose pulley, and vice versa, by a simple pull exerted on one and the same cable.

The drawings annexed represent an arrangement of this kind:

Fig. 1 is an elevation of the device applied to the disengagement and engagement of a transmission.

Fig. 2 is the plan view of the device applied to the disengagement of a transmission.

Fig. 3 represents a view on a larger scale of the appliance and

Fig. 4 a side view.

The transmission (Fig. 1) which is shown, comprises a fixed pulley 1, and a loose pulley 2, carried on the driving shaft 3. In front of the pulleys 1 and 2 a rod 4 (Figs. 1, 2, 3) is placed and can shift longitudinally, that is parallel to shaft 3. This rod 4 carries the fork 5 which passes around the belt to be shifted from pulley 2 to pulley 1 and vice versa.

According to this invention, the shifts of the rod 4, in one direction and the other, are effected by means of a system comprising a grooved wheel 6, placed in a plane perpendicular to pulleys 1 and 2 and carrying a ratchet 7, engaging in the teeth of a toothed wheel 8, mounted loose on the common spindle 9.

In the groove of the wheel 6 a cable 10 passes, being fixed to the wheel by a screw 11 and one of the ends of which carries the handle 12, which is within reach of the hand of the workman. At the other end of the cable 10 is suspended the counter-weight 13.

The toothed wheel 8 carries eccentrically a pivot 14, to which is pin-jointed a connecting rod 15, which is in turn pin-jointed to the end of the rod 4.

The eccentricity of the pivot 14 is equal to one-half of the path to be described by the fork 5; it admits of regulation by means of a slide 16.

The result of this arrangement is that, according as the pivot 14 lies left or right of the spindle 9, the fork 5 will be in front of the loose pulley 2 or in front of the fixed pulley 1. These displacements are brought about by a pull exerted by the handle 12. If for instance, in the disengagement position which is shown, the wheel 6 is made to turn half a revolution, it will carry with it the toothed wheel 8 and will bring the pivot 14 to 14′. On letting go the handle, the counter-weight 13 brings the wheel 6 back again, the ratchet 7 slipping on the teeth of the wheel 8, until the screw 11 strikes against the cross piece 17. A fresh pull exerted by the handle 12 will once more produce a disengagement by shifting back the pivot of the toothed wheel 8 from 14′ to 14, and consequently bringing the fork 5 in front of the loose pulley 2. The counter-weight 13 next returns the wheel 6 to its original position, by applying the stop screw 11 to the cross piece 17.

The toothed wheel 8 therefore executes a complete revolution for an engagement and disengagement.

Having fully described my invention, what I desire to claim and secure by Letters Patent is:

1. In a belt shifting mechanism in combination, a rotatable member, a pivot adjustably mounted on the member, a pitman journaled on the pivot, and a belt shifting member connected to the pitman.

2. In a belt shifting mechanism in combination, a rotatable member, a slide mounted substantially radially on the member, a pivot adapted to be clamped in any position along the slide, a pitman journaled on the pivot, and a belt shifting member connected to the pitman.

3. In a belt-shifting mechanism in combination, a grooved pulley wheel, a cord in said groove for rotating the wheel, a stop on the wheel and a pair of abutments limiting its movement to 180°, a counterweight on the cord for moving the wheel in one direction, a rotatable disk, a ratchet connection between the pulley and the disk, a slide mounted radially on the disk, a pivot adapted to be clamped in any position along the slide, a pitman journaled on the pivot, and a belt shifting rod connected to the pitman.

In testimony whereof I affix my signature.

DÉSIRÉ PERRIER.

Witnesses:
RONES MENNL,
J. R. SEMENAGE.